United States Patent [19]

Ito et al.

[11] Patent Number: 5,279,030

[45] Date of Patent: Jan. 18, 1994

[54] METHOD FOR PRODUCING AN ELECTRIC WIRE INSERT

[75] Inventors: Katsuya Ito; Junji Muta, both of Mie, Japan

[73] Assignee: Sumitomo Wiring Systems, Ltd., Mie, Japan

[21] Appl. No.: 900,454

[22] Filed: Jun. 18, 1992

[30] Foreign Application Priority Data

Jun. 19, 1991 [JP] Japan ................. 3-147340

[51] Int. Cl.⁵ .......................................... H01R 43/00
[52] U.S. Cl. ........................................ 29/883; 29/858; 264/263; 264/272.11; 439/736; 439/752
[58] Field of Search ................... 29/858, 883; 264/272.11, 263; 439/752, 736

[56] References Cited

U.S. PATENT DOCUMENTS

| | | | |
|---|---|---|---|
| 3,668,779 | 6/1972 | Turner | 29/858 |
| 4,319,800 | 3/1982 | Bernat . | |
| 4,495,130 | 1/1985 | Hedrick | 264/263 X |
| 4,582,388 | 4/1986 | Swaffield | 264/272.11 X |
| 4,602,831 | 7/1986 | Lockard | 29/858 X |
| 4,684,202 | 8/1987 | House et al. | 264/263 X |
| 4,961,713 | 10/1990 | McCracken et al. | 29/858 X |

FOREIGN PATENT DOCUMENTS

| | | | |
|---|---|---|---|
| 3623927 | 10/1987 | Fed. Rep. of Germany | 29/858 |
| 3731996 | 4/1988 | Fed. Rep. of Germany . | |
| 2095924 | 10/1982 | United Kingdom | 29/858 |
| 2152301 | 7/1985 | United Kingdom . | |
| 2233596 | 1/1991 | United Kingdom | 264/263 |

OTHER PUBLICATIONS

Onishi et al., "Connector for Ignition Distributor of Internal Combustion Engine", *Journal of Nippondenso Technical Disclosure,* Nov. 15, 1990, p. 129.

*Primary Examiner*—Carl J. Arbes
*Attorney, Agent, or Firm*—Sughrue, Mion, Zinn, Macpeak & Seas

[57] ABSTRACT

An electric wire insert is first produced from a primary product 10 having support projections 13 which abut on the interior of a mold and at least one bore 12 is provided on a final portion to be a part of the exterior of a resin-molded portion 1 so that at least one of the electric wires 22 extends through the bore 12 having a slightly smaller internal diameter than the external diameter of the electric wires. After inserting a terminal-pressed electric wire 20, the primary product 10 with the terminal electric wire 20 is set and disposed in position in the mold by the support projections 13. Then, a secondary forming operation is carried out. Thus, a resin-molded product 1 is formed in which a secondary forming resin covers the exterior of the primary product 10. Since the electric wire does not come into contact with the interior of the mold because of this construction, it is possible to prevent damage due to biting of the mold and to effect an automatic setting of the electric wire in the mold by a robot.

1 Claim, 6 Drawing Sheets

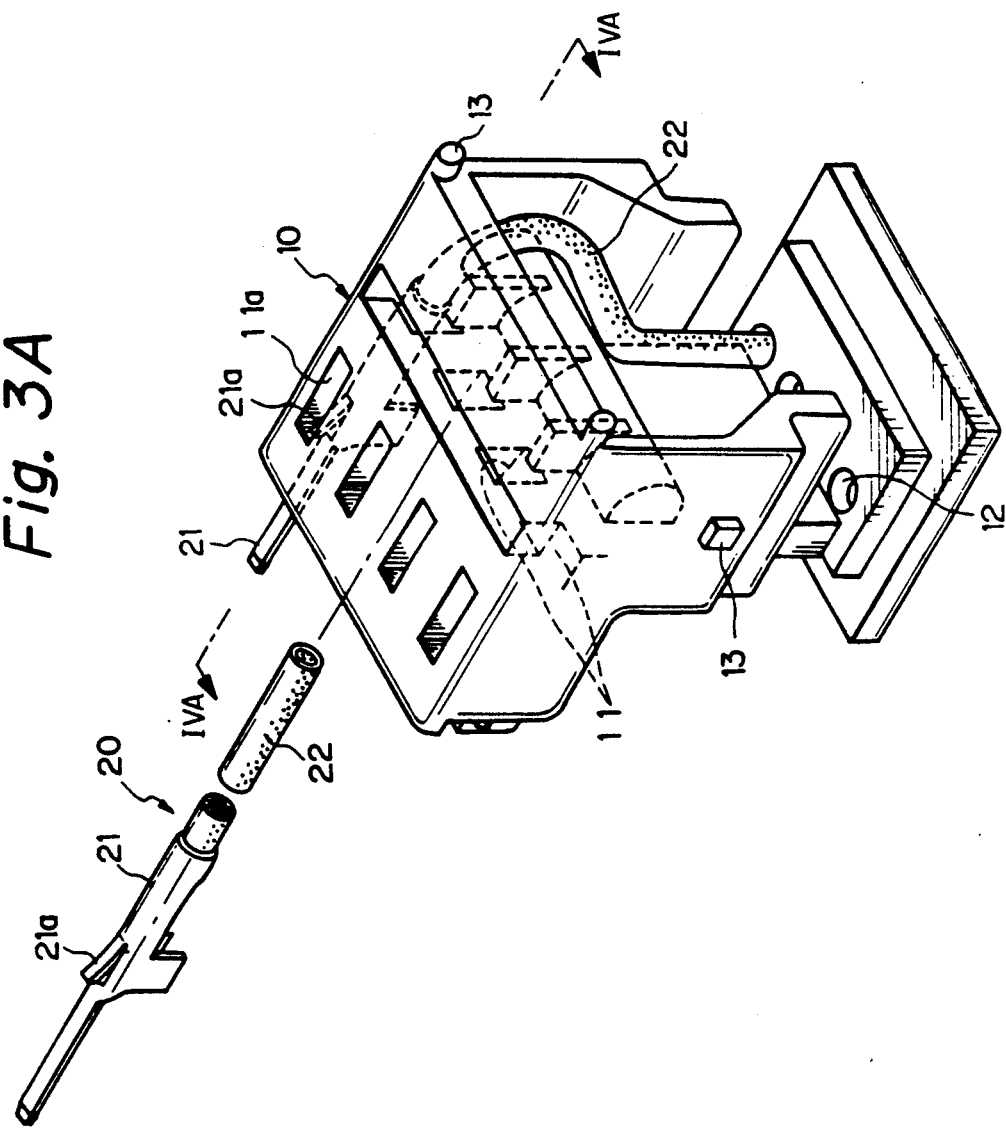

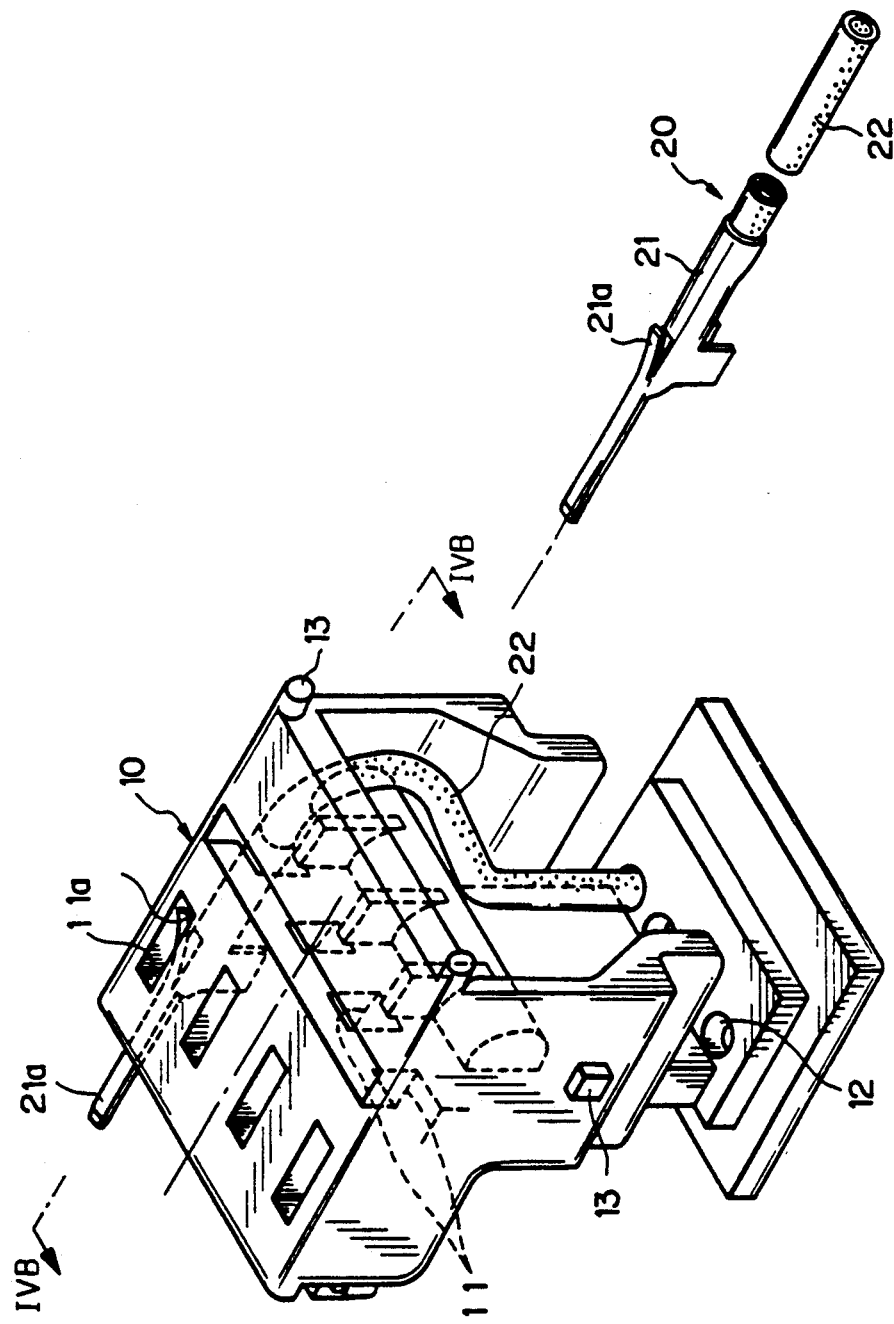

METHOD FOR PRODUCING AN ELECTRIC WIRE INSERT

BACKGROUND OF THE INVENTION

1. Field of the Invention

This invention relates to a method for producing an electric wire insert in which a resin-molded portion is integrally formed around an outer periphery of an electric wire.

2. Statement of the Prior Art

A portion which cannot be formed into a connector due to a limitation of space, or a portion which is required for anticorrosion, water-proofing, dust-proofing, or the like for a terminal is compacted and protected by forming a resin-molded portion around an outer periphery of a terminal-pressed electric wire or the like by means of insert forming.

Such an electric wire insert is produced by setting the electric wire in a split type of mold and injecting a resin material into the mold.

In the method for producing the electric wire insert, cracks are caused in the wire due to biting of the split type of mold, molding fins are generated due to resin leak, and scars are generated in a wire-fixed portion if the split type of mold is not correctly coupled.

When such faults occur in the molded portion, it is necessary to repeat the step of cutting a terminal and to then carry out further steps.

In addition, it is necessary to position the electric wire in the mold by using fins when a curved portion of the wire is formed in the mold. Consequently, it is difficult to carry out an automatic operation of setting the wire in the mold. In addition, pin-draw out holes remained in the resin-molded portion.

SUMMARY OF THE INVENTION

An object of the present invention is to provide a method for producing an electric wire insert which can overcome the problems mentioned above.

Another object of the present invention is to provide a method for producing an electric wire insert which can prevent defective goods from being produced and improve an efficiency of the working operation.

In order to achieve the above objects, the present invention provides a method for producing an electric wire insert wherein at least one electric wire is set in a mold and a resin-molded portion is integrally formed on an outer periphery of the wire, comprising the steps of:

preforming a primary product having support projections which abut on the interior of said mold and at least one bore which is provided on a portion to be a part of the exterior of said resin-molded portion so that the electric wire extends closely through the bore;

inserting the electric wire into the bore;

setting in said mold said primary product with the electric wire being inserted into the bore; and injecting a resin into said mold to form a secondary product.

In the method for producing the electric wire insert in accordance with the present invention, the primary product in which the electric wire is set is positioned in the mold by causing the support projections to abut on the interior of the mold to form a part of the resin-molded portion by secondary forming. Thus, the portion of the primary product through which the electric wire extends becomes a part of the exterior of the resin-molded portion. Consequently, it is unnecessary to split the mold at the electric wire and the electric wire does not come into contact with the interior of the mold.

BRIEF DESCRIPTION OF THE DRAWINGS

FIGS. 3A and 3B are perspective views showing a step of mounting a terminal-pressed electric wire on the primary product in FIG. 1;

DETAILED DESCRIPTION OF THE PREFERRED EMBODIMENTS

Referring now to FIGS. 1 through 6A and 6B, an embodiment of a method for producing an electric wire insert in accordance with the present invention will be explained below.

Figure 5:
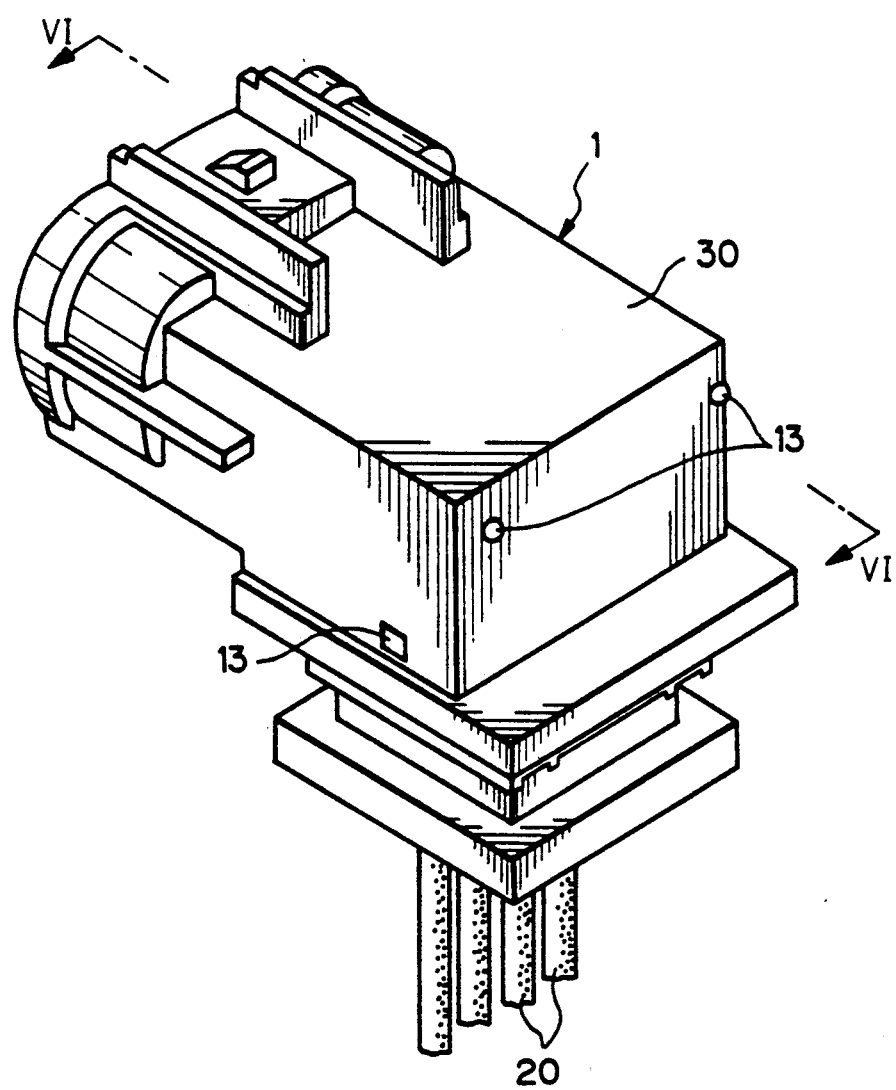
FIG. 5 is a perspective view of a finished resin-molded product which is formed from the primary product into a secondary product.

An embodiment is described herein in which four terminal-pressed electric wires disposed in parallel with each other are bent by 90° in the vicinity of a terminal and are molded in a resin material from a rear end of the terminal to the bent portion of the electric wire as shown in FIG. 5.

Figure 1:
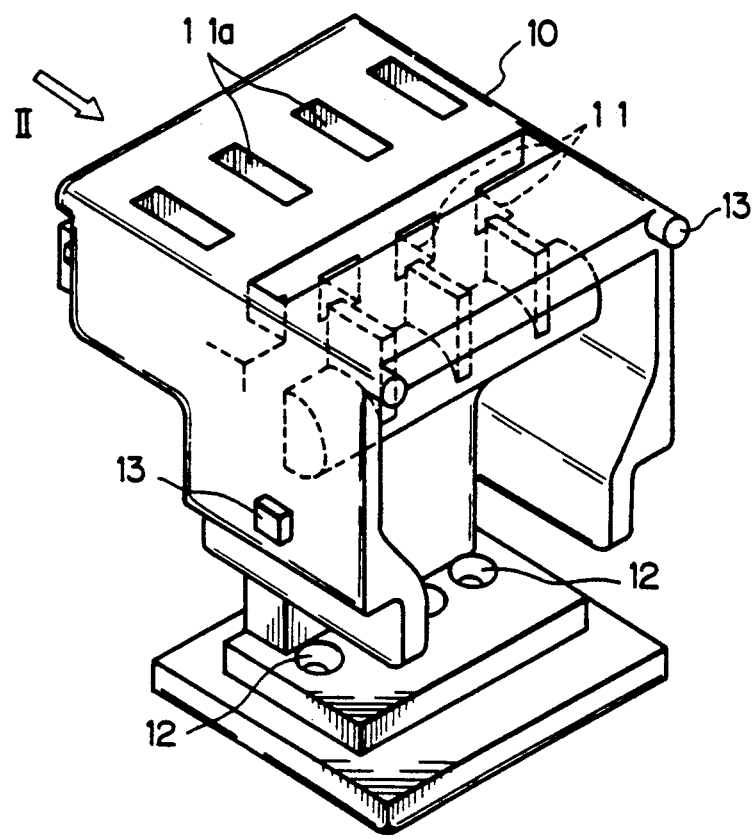
FIG. 1 is a perspective view of a primary product formed in accordance with a method of the present invention.
Figure 2:
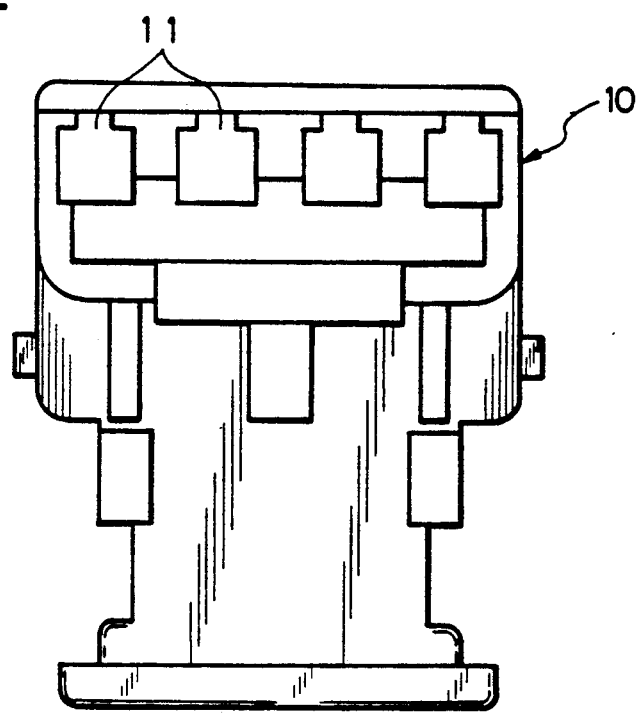
FIG. 2 is a front view taken from an arrow II in FIG. 1.

A primary product 10 for setting electric wires 22, shown in FIGS. 1 and 2, is formed from the same resin material as that of a secondary product.

The primary product 10 is provided with terminal receiving apertures 11 and wire through bores 12. As shown in FIGS. 1 and 2, the axes of the apertures 11 are perpendicular to the axes of the bores 12. Terminal locking openings 11a are formed above the terminal receiving apertures 11. The internal diameter of the wire through bores 12 is slightly smaller than the diameter of the electric wire 22.

The primary product 10 is also provided with support projections 13 on the exterior thereof.

Figure 4A:
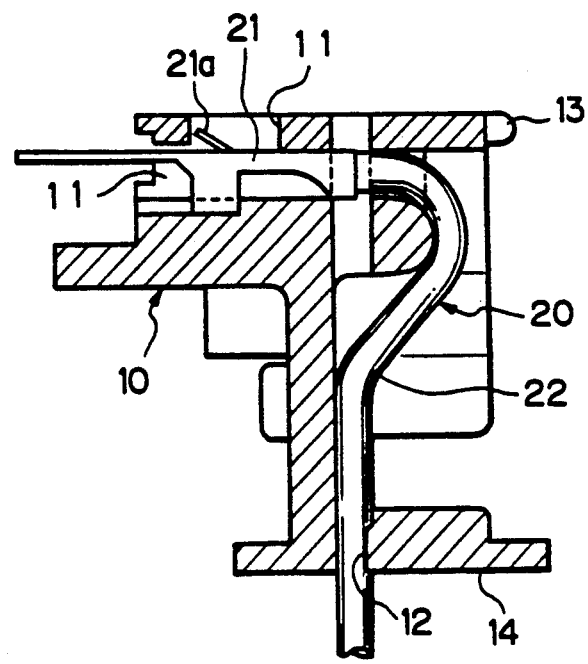
FIGS. 4A and 4B are sectional views taken along lines IVA—IVA and IVB—IVB of FIGS. 3A and 3B.
Figure 4B:
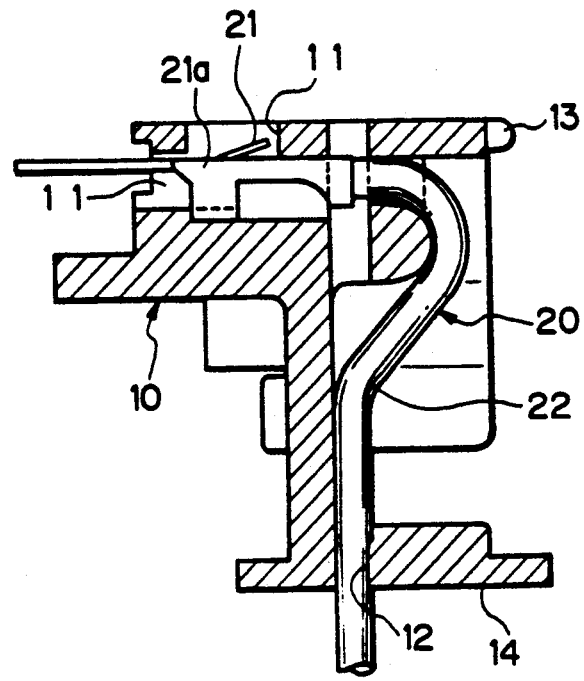

As shown in FIGS. 3A and 4A, the electric wire 22 of the terminal pressed wire 20 is inserted into the terminal receiving aperture 11 so that a rear end of a terminal 21 is received in the aperture 11 and a protrusion 21a on the terminal 21 engages with the locking opening 11a. Alternately, as shown in FIGS. 3B and 4B, the electric wire 22 of the terminal pressed wire 20 is inserted into the terminal receiving aperture 11 so that a distal end of a terminal 21 is received in the aperture 11 and a protrusion 21a on the terminal 21 engages with the locking opening 11a. The terminal pressed wire 20 is set in the primary product 10 by inserting the electric wire 22 through the bore 12 with the wire being compressed in the bore 12.

The primary product 10 with the terminal pressed wire 20 is set in the mold (not shown) so that a bottom surface 14, through which the electric wire 22 passes, finally becomes a part of the exterior of the resin-molded portion 1. At this time, it is not necessary to provide fixing pins in the mold, since the support projections 13 abut on the interior of the mold.

Figure 6A:
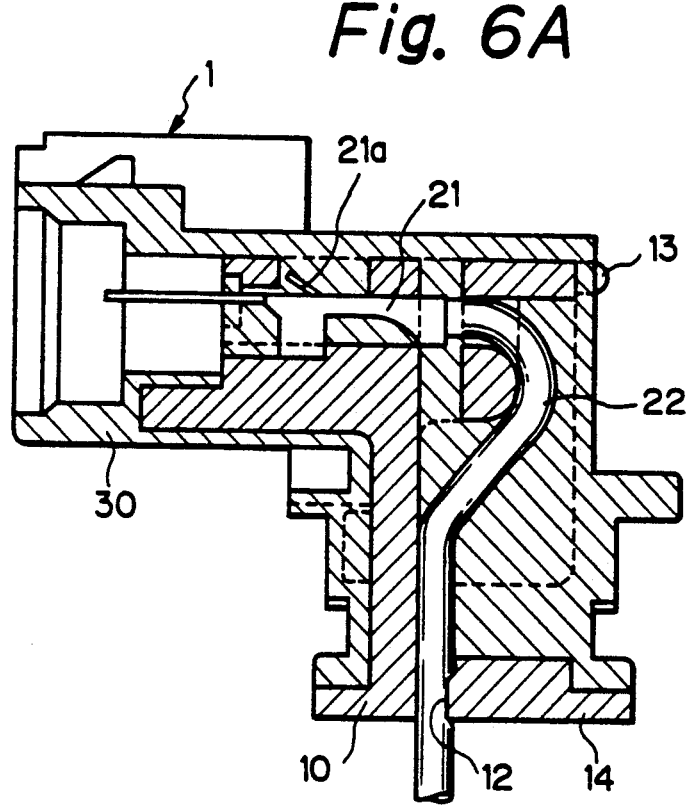
FIGS. 6A and 6B are sectional views taken along a line VI—VI in FIG. 5.
Figure 6B:
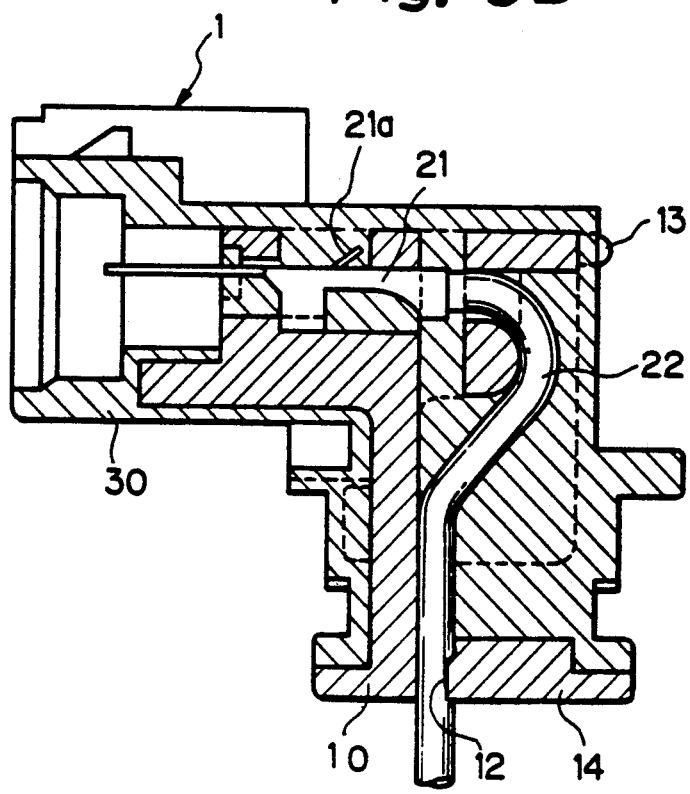

After secondary forming is finished by injecting a resin material into the mold, a secondary production having the resin-molded portion 1, in which a secondarily formed resin portion 30 covers with the primary product 10, is finally produced, as shown in FIGS. 5, 6A and 6B. The end face of the support projection 13 is exposed from the resin-molded portion 1, as shown in FIG. 5.

In the method for producing the electric wire insert, the electric wires are set in compression in the primary product and the primary product with the electric wires is set in the mold with the wire-through face being exposed from the mold. Accordingly, the electric wires do not come into contact with the mold and are not subject to cracks or other damage due to biting of the split type of mold or molding fins.

Thus, it is possible to completely prevent the production of defective goods by carrying out correction after setting the electric wires in the primary product.

In addition, the primary product is disposed in position by contacting the support projections of the primary production with the interior of the mold. The pins for fixing the primary product in the mold are not required and a part of the primary product becomes a part of the secondary product having the resin-molded portion. There is no pin-drawn out hole in the secondary product.

The process of setting the primary product in the mold can be automatically effected by a robot as a result of utilizing the primary product. Consequently, it is possible to improve a working operation.

What is claimed is:

1. A method for producing an electric wire insert wherein at least one electric wire is set in a mold and a resin-molded portion is integrally formed on an outer periphery of the electric wire, comprising the steps of:

preforming a primary product having support projections which abut on an interior of said mold and providing at least one bore on a portion of said primary product to be a part of an exterior of said resin-molded portion, so that the electric wire extends closely through said at least one bore;

inserting the electric wire into said at least one bore;

setting in said mold said primary product with the electric wire being inserted into said at least one bore, such that the interior of said mold does not come into contact with the electric wire; and injecting a resin into said mold to form a secondary product.

* * * * *